(12) United States Patent
Manigatter et al.

(10) Patent No.: US 7,211,213 B2
(45) Date of Patent: May 1, 2007

(54) INJECTION-MOLDING NOZZLE SYSTEM FOR INJECTION-MOLDING SYSTEMS FOR PLASTIC MATERIALS, INJECTION-MOLDING TOOL AND METHOD FOR PRODUCING INJECTION-MOLDED PARTS

(75) Inventors: Kurt Manigatter, Alkoven (AT); Christian Reslhuber, Niederneukirchen (AT); Paul Fattinger, Heiligenberg (AT); Karl Adlesgruber, Allhaming (AT)

(73) Assignee: ELAST Kunststoffverarbeitungs-GmbH & Co. KEG, Heiligenberg (AU)

( * ) Notice: Subject to any disclaimer, the term of this patent is extended or adjusted under 35 U.S.C. 154(b) by 146 days.

(21) Appl. No.: 10/461,054

(22) Filed: Jun. 13, 2003

(65) Prior Publication Data
US 2004/0217499 A1    Nov. 4, 2004

(30) Foreign Application Priority Data
Apr. 30, 2003    (EP) .................................. 03450107

(51) Int. Cl.
*B29C 45/22* (2006.01)
*B29C 45/23* (2006.01)

(52) U.S. Cl. .............................. 264/328.1; 264/328.12; 425/562; 425/564; 29/426.1; 29/428

(58) Field of Classification Search ................ 264/40.1, 264/328.12, 328.1; 425/562, 564; 29/426.1, 29/428
See application file for complete search history.

(56) References Cited

U.S. PATENT DOCUMENTS 2,770,011 A * 11/1956 Kelly .......................... 425/563
5,334,008 A * 8/1994 Gellert ........................ 425/549
5,505,613 A * 4/1996 Krummenacher ........... 425/562
5,531,581 A * 7/1996 Donnell, Jr. ................ 425/145
5,849,343 A * 12/1998 Gellert et al. ............... 425/549
5,900,200 A * 5/1999 Teng ........................... 264/106
6,089,468 A * 7/2000 Bouti ........................... 239/11
6,135,757 A * 10/2000 Jenko .......................... 425/562

(Continued)

FOREIGN PATENT DOCUMENTS

CH    662 085 A5    9/1987

(Continued)

*Primary Examiner*—Jill L. Heitbrink
(74) *Attorney, Agent, or Firm*—Pandiscio & Pandiscio

(57) ABSTRACT

The present invention relates to an injection-molding nozzle system for injection-molding systems for plastic materials which is equipped with a needle sealing system and is suitable both for different cavities as well as for plastic materials of different viscosities, with the injection-molding nozzle comprising a temperable nozzle body with nozzle tip comprising an outlet opening and an inlet opening for the plastic mass, as well as a needle which is arranged in the nozzle body and is displaceable in an axially longitudinal manner and with an actuating apparatus for actuating the needle which is axially displaceable in the nozzle body in the longitudinal direction. The opening stroke of the needle which is axially displaceable in the longitudinal direction can be adjusted by way of a stroke limiter, and the needle tip comprises at least one notch for the pass-through of the injection-molding mass in its transitional region to the needle shaft. The needle shaft is thereby in continual contact with a needle guide region of the nozzle tip.

19 Claims, 2 Drawing Sheets

U.S. PATENT DOCUMENTS

| | | | |
|---|---|---|---|
| 6,228,309 B1 * | 5/2001 | Jones et al. | 264/328.8 |
| 6,419,116 B1 * | 7/2002 | Eigler et al. | 222/1 |
| 6,769,901 B2 * | 8/2004 | Babin et al. | 425/549 |
| 6,884,061 B2 * | 4/2005 | Okamura et al. | 425/557 |

FOREIGN PATENT DOCUMENTS

| | | |
|---|---|---|
| CH | 686 715 A5 | 6/1996 |
| DE | 28 32 877 A1 | 2/1979 |
| DE | 38 43 035 A1 | 6/1990 |
| DE | 195 16 491 A1 | 7/1996 |
| EP | 0 818 295 A1 | 1/1998 |
| GB | 779 071 A | 7/1957 |

* cited by examiner

INJECTION-MOLDING NOZZLE SYSTEM FOR INJECTION-MOLDING SYSTEMS FOR PLASTIC MATERIALS, INJECTION-MOLDING TOOL AND METHOD FOR PRODUCING INJECTION-MOLDED PARTS

BACKGROUND OF THE INVENTION

The present invention relates to an injection-molding nozzle for plastic injection-molding systems which is provided with a needle sealing system and is suitable to be used both for different cavities as well as for plastic materials with different viscosities. It further relates to a plastic injection mold with at least one such injection-molding nozzle as well as the use of such a plastic injection mold.

DESCRIPTION OF THE PRIOR ART

Needle seal nozzles are known from the state of the art. They offer the advantage of a controlled pressure build-up in the cavity as compared to open nozzles as are widely used in injection molds. A minimization of the sprue part can further be achieved in needle seal nozzles by closing the opening as compared with open system, which may even go so far that no sprue point can substantially be recognized on the plastic product without any finishing.

Most gating systems which comprise needle seal nozzles comprise an active sealing of the outlet opening. The opening occurs passively however via the pressure of the starting material entering the nozzle chamber. This leads to the disadvantage that the cavity cannot be filled in a controlled fashion. In order to remedy this situation the filling process is controlled in such a way in such systems that a throttle for setting the pressure distribution of the plastic mass is built into the feed line of the stream of mass to the nozzle. Said throttle allows a regulation of the mass flow through a constriction in the cross section. This leads to the problem, however, that the air in the cavity can only be displaced in an uncontrolled manner. This is caused by the fact that cross-sectional constriction as introduced by the throttle in the feed channel makes a controlled pressure build-up to the nozzle more difficult or even renders this impossible. Due to the merely insufficient displacement of air during the filling process it is possible that residual air remains in the filled cavity, leading to losses in quality and adversely reproducible injection conditions.

This problem is solved in a needle sealing system which is described in EP 818 295 in such a way that the opening stroke of the axially displaceable needle of the needle seal nozzle is adjustable. This allows setting the outlet opening by changing the nozzle gate cross section over the needle position. In this way it is possible to achieve very constant injection conditions and thus also precise reproducibility. Moreover, the filling process of the hollow chamber can be adjusted with ease and thus the tool can be fine-tuned in the balance in a simple manner, i.e. especially in the case of several tools it is possible to achieve a substantially even pressure build-up by setting the needle seal nozzle in all cavities.

Another needle seal nozzle known from DE 195 16 491 solves the problem of optimizing the injection point by a calibration. An inclined counter-surface rests in a continually surface-parallel manner on each inclined drive surface as a counter-surface of the sealing body and a coupling guide piece is arranged between the free end of the drive bar averted from the drive unit and the free end of the slider averted from the sealing body, which coupling guide piece connects both free ends in a tensile- and pressure-proof manner and which is guided in a straight line on guide surfaces on the side of the tool plate in the direction of movement of the slider. The drive unit can be axially displaced and arrested for the precise setting of the sealing position of the sealing body in the direction of movement of the slider.

CH 686 715 describes a method for producing packing containers, with the flow quantity being regulated in that the flow resistance in the channels between the injection unit and each respective mold cavity is balanced by means of adjustable needle valves which control the flow of plastic into each respective mold cavity. Once the desired quantity of plastic mass has been introduced into the cavity, the needle is displaced axially downwardly by means of a piston and cylinder unit, namely until it comes to a sealing stop with the seat of the nozzle, with the lower end of the needle being arranged substantially in a flush manner with the surface of the mold wall.

All these systems come with the serious disadvantage that the needle tip is retracted relatively far from the sealing position during the filling process of the cavity with plastic mass. A further disadvantage is that the needle can be deflected laterally by the injection-molding mass in the opening position and especially during the sealing process, so that its cylindrical sealing part may under certain circumstances not precisely hit the respective counter-opening. Instead it hits the edge of the aperture first and thus leads to damage both on the needle tip per se as well as said aperture edge over time.

It is therefore known to arrange needle sealing systems in such a way that the needle has a tapering sealing end which enters a respectively conical aperture. A sealing needle is further known from DE 28 32 877 which is held by a guide body, so that it cannot be deflected laterally. Said guide body lies directly around the needle, so that the stream of hot plastic needs to be deflected laterally around said guide body and consequently reaches cold regions of the nozzle wall and its ambient environment. This changes the viscosity of the molding mass briefly, which leads to considerable changes in the flow and resistance which may under certain circumstances produce an insufficient filling of the mold. Even if a complete filling of the mold is achieved, a final product may be obtained which is unsatisfactory visually or mechanically or concerning the dimensional accuracy when the plastic is cooled too strongly during the injecting.

In order to solve this problem CH 662 085 proposes installing a pre-centering body in the nozzle tip which comprises a conically tapering inside wall which encloses an approach angle with the needle axis which is smaller than or equal to an angle between a connecting straight line from one point of the front edge of the cylindrical sealing region to a point lying on a parallel diameter of the next larger offset of the sealing needle and the needle axis.

This measure ensures that in the case of any deflection of the sealing needle, the offset with the larger diameter comes to lie on the inside of the pre-centering body, so that the sensitive front cylindrical sealing surface of the needle remains free from contact. It is also achieved by the channels in the pre-centering body that the molding material does not have to be deflected over outside cold regions. Contrarily, it can also flow in the region of the pre-centering body per se between the same and the needle. The pre-centering body per se represents a part that is highly subject to wear and tear, which is why this solution requires frequent maintenance work.

A further development of this idea is given by DE 38 43 035, in which the inside hollowing of the housing of a needle seal nozzle is arranged eccentrically on the side on which the feed opening for the material opens into said housing and the inside hollowing. The guidance of the needle which is arranged in a concentric fashion in the housing reaches over the entire needle length on its side averted from the feed opening. In this way the material can no longer flow about the needle. This solution comes with the serious disadvantage however that extremely high frictional forces arise between the needle and its guide means. In order to remedy this situation the solution provides that the guide device is provided with regions which in the interior are open towards the needle. However, in the case of an undesirable entrance of molding material they lead to virtually unsolvable problems by premature wear and tear.

SUMMARY OF THE INVENTION

It is an object of the present invention to provide an injection-molding nozzle with a needle sealing system which avoids the aforementioned disadvantages of the cited state of the art and allows a continuous setting in the simplest possible way of the opening stroke of the sealing needle which is axially displaceable in the longitudinal direction, so that the injection-molding nozzle can be used for molding materials of a large variety of viscosities, as a result of which the flow rate can be chosen in a continuous manner.

It is a further object of the present invention to provide a substantially wear-free needle tip.

It is a further object of the present invention to provide an injection-molding nozzle with a nozzle seal which allows a simple disassembly and re-assembly both of the injection-molding nozzle from the part of the injection-molding system which is attached to the machine as well as the sealing needle from the injection-molding nozzle in order to relieve the system from adhering molding material in the simplest possible way in order to thus substantially increase the service life of the system including the injection-molding nozzle with the needle seal. This is of considerable advantage especially when using them in cold-channel systems as are used for the production of products made of silicone caoutchouc.

These objects are achieved in accordance with the invention in such a way that a needle sealing system is configured in accordance with the preamble of claim 1 in such a way that the opening stroke of the axially displaceable needle of the needle seal nozzle can be adjusted continuously by a stroke-arresting device, that the needle tip comprises notches and that the needle tip comprises a cylindrical intermediate region with which the needle tip is in continual contact with the needle guide region of the needle tip. Alternative embodiments and advantageous further developments are represented in the dependent claims.

BRIEF DESCRIPTION OF THE DRAWINGS

The invention is now explained in closer detail by reference to the enclosed drawings, wherein.

DETAILED DESCRIPTION OF THE PREFERRED EMBODIMENTS

Figure 1:
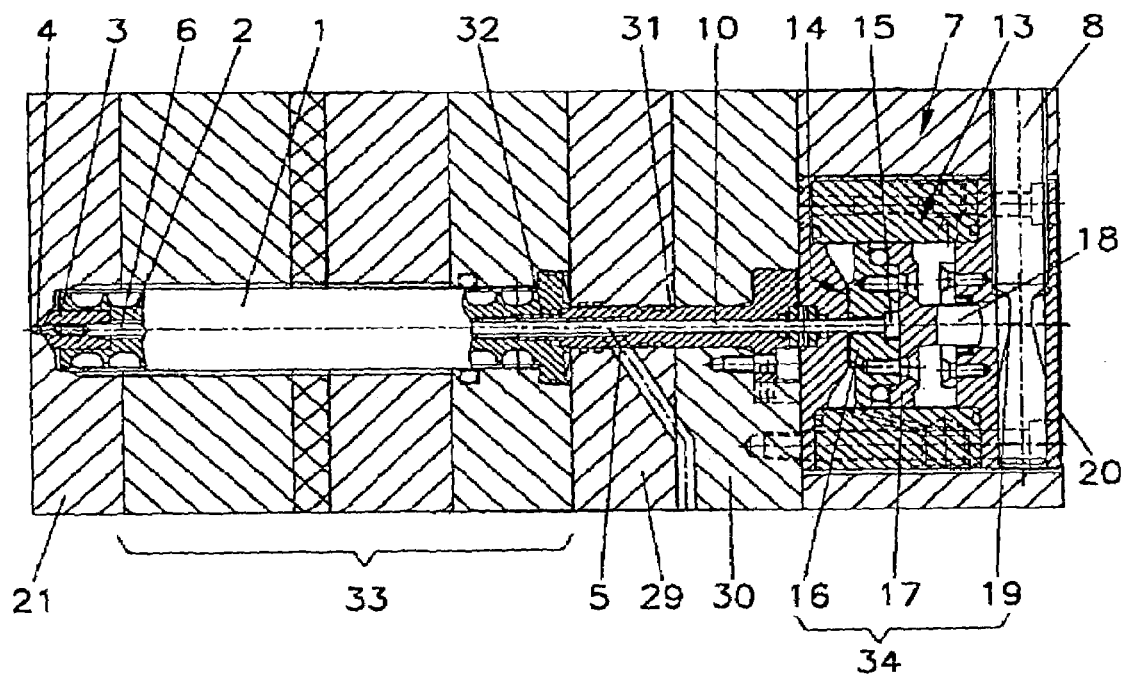
FIG. 1 shows a longitudinal sectional view through the injection-molding nozzle system in accordance with the invention.

As can be seen in FIG. 1, the injection-molding nozzle system in accordance with the invention is equipped with a nozzle seal 6. The system can be used both for different cavities as well as for plastic materials of different viscosities. That is why the field of application of an installation with the injection-molding nozzle system in accordance with the invention shows a high amount of flexibility. On the one hand, a large variety of objects can be produced from the same injection-molding material by a simple exchange of the cavity plates 21. On the other hand, it is possible by changing the range of stroke to produce objects from the injection-molding masses with a large variety of viscosities. A change of the stroke range in cooperation with the notches 11 in the needle determines the flow rate of a certain injection-molding material at a predetermined temperature.

The injection-molding nozzle system consists of a temperable nozzle body 2 and an inserted nozzle tip 3. It further comprises an outlet opening 4 and a feed opening 5 for the plastic mass as well as a needle 6 which penetrates the nozzle body 2 and is displaceable axially in the longitudinal direction in the nozzle body 2 by an actuating apparatus 7. The opening stroke of the needle 6 which is axially displaceable in the longitudinal direction can be adjusted through a stroke limiter 8. The needle tip 9 is provided in its transition region to the needle shaft 10 with notches 11 for the passage of the injection-molding mass, with the needle shaft 10 being in continual contact with a needle guide region 12 of the nozzle tip 3.

The actuating device 7 can be configured both as a hydraulic drive as well as a pneumatic drive. A pneumatic drive will usually be employed due to the local conditions and the more cost-effective design.

A particularity of the present invention is the two-part design of the piston 13. The part 14 of the needle 6 which is held in the actuating apparatus 7 has an end piece 15 with a larger diameter than the needle shaft 10 and is clamped with this end piece 15 between the two piston parts 16 and 17.

Part 17 of the two-part piston 13 carries a piston ram 18 which projects from the hydraulic or pneumatic drive system. The maximum path of the piston ram 18 from the hydraulic or pneumatic drive system is determined by a stroke limiter 8. Said stroke limiter 8 comprises a conical or wedge-like section 19 which is moved via an actuating apparatus (not shown) along a path perpendicular to the imaginary extension of the needle axis.

In the simplest of cases, said actuating apparatus can be a spindle that can be actuated by hand, a slider or any other imaginable actuating apparatus. Based on the special arrangement of the stroke limiter 8, the actuating apparatus can be activated by the user without needing to detach any parts of the apparatus from its mounted arrangement, as is the case in the apparatus according to EP 818 295. This leads to a reduction in the set-up time when changing over to another cavity shape or even in the case of a changed viscosity of the injection-molding mass. Furthermore, a re-adjustment can occur in a very simple and rapid manner. It is also possible to operate the actuating apparatus in a program-controlled manner.

Figure 2:
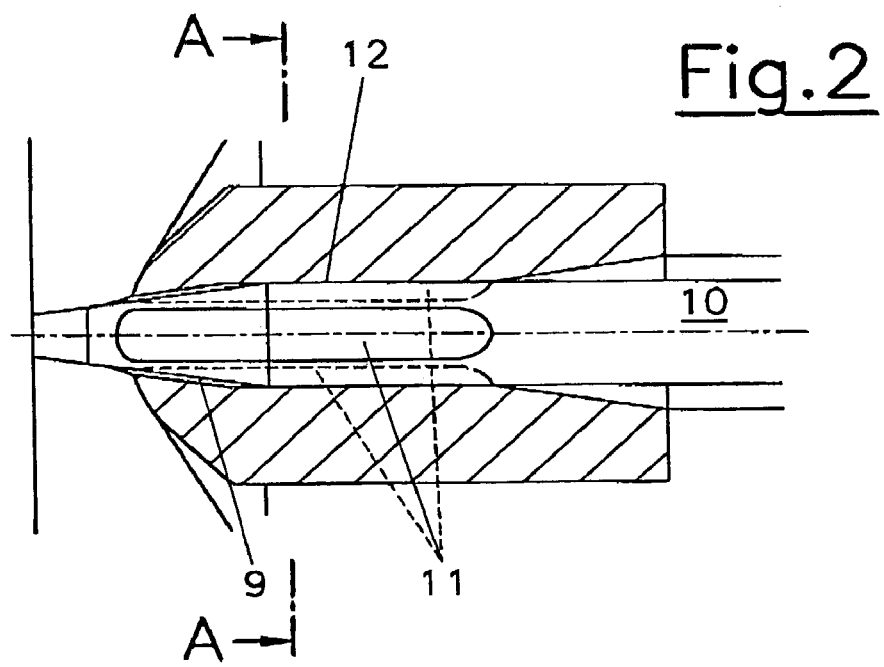
FIG. 2 shows an enlarged sectional view of FIG. 1 with the nozzle tip which rests on the cavity plate, with the needle tip keeping sealed the pass-through region for the injection-molding mass.
Figure 4:
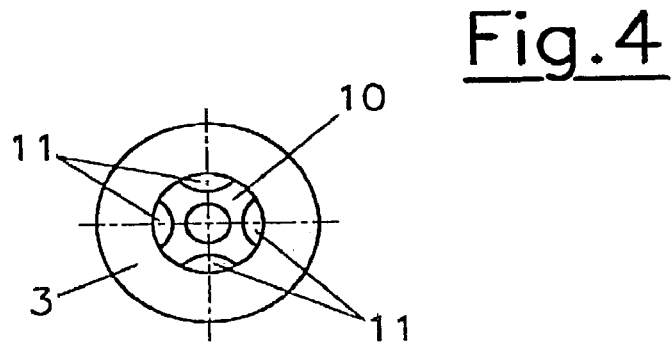
FIG. 4 shows a sectional view through the enlarged sectional view of FIG. 2 along the line A—A.
Figure 3:
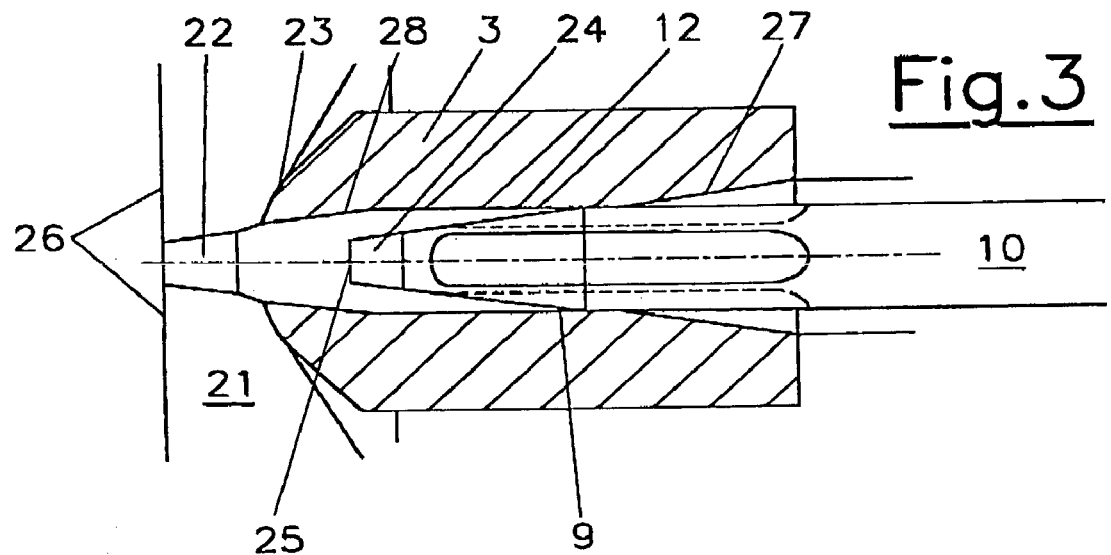
FIG. 3 shows the same enlarged sectional view of FIG. 1, with the needle tip being retracted here up to the maximum stroke.

As is very clearly shown in FIGS. 2 and 3, the injection-molding nozzle 1 rests with its preferably concavely shaped bearing surface 23 of the nozzle tip 3 on the cavity plate 21 which comprises a conically tapering pass-through bore 22 in which the needle 6 enters with the front part 24 of the needle tip 9 for sealing off the inlet path and with its tip surface 25 closes off the inner surface 26 of the cavity plate 21 in a form-fitting manner. The inner wall of the nozzle tip 3 is provided with a cylindrical arrangement in the direction of flow of the injection-molding mass between two conically tapering regions 27 and 28. Said region, as the needle guide region 12, is in continual contact with the cylindrical needle shaft 10. By this construction it is thus possible, in combination with the stroke limiter 8 which sets the maximum range of stroke in such a way that the needle shaft must lie at least with a very narrow ring-like region within the cylindrical needle guide range 12 to prevent that the needle tip can ever leave its centered position. In this way it is not possible to either rub the edge 25 of the needle or the conically tapering end of the needle tip 9 on the inner surface of the nozzle tip 3. The only contact arises in the moment of the sealing of the pass-through bore 22. Since this contact occurs simultaneously over the entire surface, there cannot be any wear and tear of the needle tip 9 at that moment.

Since the needle guide region 12 is in continual contact with the cylindrical needle shaft 10 in the circumferential direction, it is necessary to provide several notches 11 in the transitional region of the cylindrical needle shaft 10 into the conically tapering needle tip 9, which notches are evenly distributed over the circumferential direction, in order to allow an unobstructed passage of the injection-molding mass. This construction prevents in addition that a lateral pressure can occur on the needle by the injection-molding mass.

A similar solution is proposed by CH 662 085. In this case however, the notches are provided in a separate pre-centering body which is installed in the nozzle tip. Since hardened plastic deposits will also occur after some time within the nozzle tip, especially when processing silicone caoutchouc, it is necessary to remove such residues in regular service intervals as completely as possible. This cleaning entails substantially less work by the injection-molding nozzle system in accordance with the invention, and it can be carried out more quickly and completely than in the design according to CH 662 085.

When removing the needle 6 from the injection-molding system according to the invention, a complete smooth interior surface of the nozzle tip 3 is open. The nozzle tip 3 does not have to be removed from the nozzle body 2 for cleaning purposes. In the design according to CH 662 085 it is necessary to separate the nozzle tip from the nozzle body in order to remove and clean the pre-centering body. Interior notches are more difficult to access for cleaning than exterior notches as are present in the needle 6 in accordance with the invention.

The notches 11 can substantially have the shape of a section of a cylinder jacket. It is also possible that the notches 11 are provided with a helical shape. An especially advantageous embodiment of the invention comprises notches 11 which are provided with a substantially wedge-like arrangement. This shape of notches offers in combination with the stroke limiter 8 the best results concerning the controllability of the flow. The number of notches 11 in the circumferential direction of the needle 6 can principally be chosen at will. Ideally, it will lie between 3 and 5.

The needle 6 is held in the distributor plates 29 and 30 within the guide bush 31 which penetrates the distributor plates 29 and 30 and projects with a section 32 into the nozzle body 2. This design further increases the security of needle 6 against bending by lateral pressure through the injection-molding mass, because the inlet opening 5 of the injection-molding mass is situated before the section 32 of the guide bush 31 as seen in the direction of flow. This design in accordance with the invention becomes especially advantageous once the needle 6 has been removed from the nozzle body 2 for cleaning or has been inserted in the same again, because the needle 6 does not have to be removed from the guide bush 31 for cleaning purposes and is thus held in a more stable fashion while it is moved in the axial direction. This measure also reduces the likelihood of damaging the needle tip 9.

It is easy to see that one or several of the injection-molding nozzle systems of FIG. 1 can form a common plastic injection-molding tool when arranged successively one after the other, with the at least one injection-molding nozzle 1 being arranged in a nozzle block 33 and the at least one actuating apparatus 7 in a drive block 34 and with distributor plates 29 and 30 for the supply of the injection-molding mass being provided between the nozzle block 33 and the drive block 34. The at least one stroke limiter 8 is arranged in a cover 20 of the actuating apparatus 7. The cavity plate 21, the nozzle block 33, the distributor plates 29 and 30, the drive block 34 and the cover 20 of the actuating apparatus 7 form the part of the injection-molding system which is fixedly attached to the machine.

It is also possible to integrate the actuating apparatus 7 in the distributor plates 29 and 30. In this way it is possible to reduce the overall height of the system without causing any additional work in the production of the tool. The stroke limiter 8 is actuated directly from the machine operator's side.

It is further possible, in a further development of the invention, to configure the stroke limiter 8 in such a way that more than one sealing needle 6 is limited in its stroke by a stroke limiter 8.

In order to remove and remount the injection-molding system of the plastic injection-molding tool in accordance with the invention for the purpose of cleaning the injection-molding nozzle 1 and the needle 6 from any adhering plastic residue or for the purpose of exchanging any damaged parts of the injection-molding nozzle system by breakage or improper handling during mounting, the part of the injection-molding tool which is fixed to the machine is removed from the machine mounting plate, the cover 20 of the actuating apparatus 7 is removed and the actuating apparatus 7 is pulled out of the injection-molding nozzle system in the closed state of the needle 6, whereupon the guide bush 31 is removed and subsequently the nozzle body 2 can be removed with the nozzle tip 3 from the nozzle block 33. All components can then be easily cleaned. All components are then easy to clean, interior walls have no portions that are difficult to access and the needle 6 can be handled more easily than in conventional systems by the holding device in the guide bush 31 and by the fact that the needle head 15 need not be removed from the actuating apparatus 7. The actuating apparatus merely needs to be opened in the case of needle breakage, such that the two cylinder parts 16 and 17 are detached from each other.

In order to perform service work even more simply and quickly, it has proven to be especially advantageous to fixedly connect the part of the injection-molding system which is fixed to the machine with the movable part of the injection molding system via quick-acting clamping devices prior to the detachment from the machine clamping plate.

Since it contains a tempering apparatus in the nozzle body 2, the injection-molding system in accordance with the invention can be used both for processing silicone caoutchouc as a cold-channel gating system as well as for processing thermoplastic material as a hot-channel gating system. It is naturally also possible to easily perform the processing of rubber with the injection-molding method by means of the present invention.

What is claimed is:

1. A method for producing injection-molded parts with injection-molding materials of different viscosities, the method comprising:
   (i) providing an injection-molding tool for plastic materials, the tool comprising:
       at least one injection-molding nozzle system, equipped with a needle seal, wherein the system comprises a temperable nozzle body; a nozzle tip comprising an outlet opening and an inlet opening for a plastic mass; and a needle arranged in the nozzle body and axially displaceable between different positions in a longitudinal direction by an actuating apparatus; and
       at least one stroke limiter for directly determining a stroke of the needle, said stroke limiter comprising a conical section movable along a path perpendicular to an imaginary extension of the needle axis;
       wherein the needle comprises a needle tip and a needle shaft with at least one notch for the pass-through of the plastic mass;
       and wherein the nozzle tip is provided with a needle guide region for guiding the needle in radial directions; and
   (ii) controlling the flow rate through the nozzle body via the sum total of the free cross sections of each of the at least one notches in the cylindrical needle guide region, the shape of the notches and the setting of the stroke limiter at the opposite end of the needle.

2. A method for dismounting and remounting an injection-molding nozzle system of an injection-molding tool for plastic materials, cleaning any plastic residues from the injection-molding nozzle system, or exchanging any damaged parts of the injection-molding nozzle system, comprising:
   (i) providing an injection-molding tool for plastic materials, the tool comprising:
       at least one injection-molding nozzle system, equipped with a needle seal, wherein the system comprises a temperable nozzle body; a nozzle tip comprising an outlet opening and an inlet opening for a plastic mass; and a needle arranged in the nozzle body and axially displaceable between different positions in a longitudinal direction by an actuating apparatus; and
       at least one stroke limiter for directly determining a stroke of the needle, said stroke limiter comprising a conical section movable along a path perpendicular to an imaginary extension of the needle axis;
       wherein the needle comprises a needle tip and a needle shaft with at least one notch for the pass-through of the plastic mass;
       and wherein the nozzle tip is provided with a needle guide region for guiding the needle in radial directions; and
   (ii) arranging the at least one injection-molding nozzle system in a nozzle block and at least one actuating apparatus in a drive block, the distributor plates for the supply of the injection-molding mass between the nozzle block and the drive block, and the at least one stroke limiter in a cover of the actuating apparatus so that the nozzle block, the distributor plates, the drive block and the cover form a part of the injection-molding nozzle system which is fixed to the machine; and
   (iii) detaching a part of the injection molding tool which is fixed to the machine from the machine clamping plate by removing the cover and pulling out the actuating apparatus in the closed state with the guide bush and the needle from the injection-molding nozzle system, so that the nozzle body and the nozzle tip can be removed from the nozzle block.

3. A method according to claim 2, wherein a part of the injection-molding nozzle system which is fixed to the machine is fixedly connected to the movable part of the injection-molding nozzle system via quick-acting clamping devices prior to the detachment from the machine clamping plate.

4. An injection-molding nozzle system used to inject plastic materials into different cavities and for injecting plastic materials of different viscosity, said system equipped with a needle seal, and comprising:
   an injection-molding nozzle comprising a temperable nozzle body; a nozzle tip comprising an outlet opening and an inlet opening for a plastic mass; and a needle arranged in the nozzle body and axially displaceable in a longitudinal direction by an actuating apparatus; and
   a stroke limiter for directly determining a stroke of the needle, said stroke limiter comprising a conical section movable along a path perpendicular to an imaginary extension of the needle axis;
   wherein the needle comprises a needle tip and a needle shaft with at least one notch for the pass-through of the plastic mass;
   wherein the nozzle tip is provided with a needle guide region for guiding the needle in radial directions;
   and wherein the adjustable stroke of the needle and the arrangement on the at least one notch of the needle determines the flow rate of the plastic materials.

5. An injection-molding nozzle system according to claim 4, wherein the at least one notch is near the needle tip.

6. An injection-molding nozzle system according to claim 4, wherein the at least one notch is near the needle shaft.

7. An injection-molding nozzle system according to claim 4, wherein the actuating apparatus for displacing the needle is configured as a selected one of a hydraulic and a pneumatic drive system which comprises a piston consisting of two piston parts, the part of the needle held in the actuating apparatus comprising an end piece with a larger diameter than the needle shaft and clamped between the two piston parts.

8. An injection-molding nozzle system according to claim 7, wherein a part of the piston comprises a piston ram which projects from the drive system, with the maximum path of the piston ram from the drive system being determined by the stroke limiter.

9. An injection-molding nozzle system according to claim 4, wherein the injection-molding nozzle with a bearing surface of the nozzle tip rests on a cavity plate which comprises a conically tapering pass-through bore into which the needle penetrates for sealing off the inlet opening with the needle tip and seals in a form-fitting manner an inner surface of a cavity plate with its tip surface.

10. An injection-molding nozzle system according to claim 4, wherein an inner wall of the nozzle tip comprises a cylindrically shaped region between two conically tapering regions in the direction of flow of the injection-molding mass, which cylindrically shaped region is in continual contact with the cylindrical needle shaft as a needle guide region.

11. An injection-molding nozzle system according to claim 4, wherein the cylindrical needle shaft converges into a conically tapering needle tip, with each of the at least two notches in said converging region evenly distributed in the circumferential direction.

12. An injection-molding nozzle system according to claim 11, wherein each of the at least one notches have a shape selected from a group consisting of a section of a cylinder jacket, a wedge-like arrangement and a helical arrangement.

13. An injection-molding nozzle system according to claim 4, wherein the needle guide region is cylindrical and smooth.

14. An injection-molding nozzle system according to claim 4, wherein the needle is held in distributor plates in a guide bush which penetrates the distributor plates and projects with a section into the nozzle body.

15. An injection-molding tool for plastic materials, the tool comprising:
at least one injection-molding nozzle system, equipped with a needle seal, wherein the system comprises a temperable nozzle body; a nozzle tip having an outlet opening and an inlet opening for a plastic mass; and a needle arranged in the nozzle body and axially displaceable in a longitudinal direction by an actuating apparatus; and
at least one stroke limiter for directly determining a stroke of the needle, said stroke limiter comprising a conical section movable along a path perpendicular to an imaginary extension of the needle axis;
wherein the needle comprises a needle tip and a needle shaft with at least one notch for the pass-through of the plastic mass;
wherein the nozzle tip has a needle guide region guiding the needle in radial directions;
and wherein the adjustable stroke of the needle and the arrangement of the at least one notch on the needle determines the flow rate of the plastic materials.

16. An injection-molding tool according to claim 15, wherein at least one injection-molding nozzle system is arranged in a nozzle block and wherein at least one actuating apparatus is arranged in a drive block, and wherein distributor plates for the supply of the injection-molding mass are provided between the nozzle block and the drive block, and wherein at least one stroke limiter is arranged in a cover of the actuating apparatus and further wherein the nozzle block, the distributor plates, the drive block and the cover form a part of the injection-molding nozzle system which is fixed to the machine.

17. An injection-molding tool for plastic materials according to claim 15, wherein the at least one actuating apparatus is integrated with at least one of the distributor plates.

18. An injection-molding tool for plastic materials according to claim 15, wherein at least one stroke limiter is actuated directly from the operator's side of the tool.

19. An injection-molding tool for plastic materials according to claim 15, wherein at least one stroke limiter is arranged in such a way that the stroke of more than one sealing needle can be limited by a stroke limiter.

* * * * *